United States Patent [19]
Kang et al.

[11] Patent Number: 5,800,695
[45] Date of Patent: Sep. 1, 1998

[54] PLATING TURBINE ENGINE COMPONENTS

[75] Inventors: David Kang; Kevin Updegrove, both of Carson City; Frank Goodwater, Reno, all of Nev.

[73] Assignee: Chromalloy Gas Turbine Corporation, San Antonio, Tex.

[21] Appl. No.: 733,028

[22] Filed: Oct. 16, 1996

[51] Int. Cl.[6] .................. C25D 7/04; B05D 1/32
[52] U.S. Cl. .................. 205/135; 427/282; 205/149
[58] Field of Search .................. 205/135, 118, 205/665, 149; 118/721, 406, 504–505; 427/282

[56] References Cited

U.S. PATENT DOCUMENTS

| | | | |
|---|---|---|---|
| 2,999,771 | 9/1961 | Gaynes | 117/132 |
| 3,451,902 | 6/1969 | Levinos | 204/15 |
| 3,749,654 | 7/1973 | Mikulski | 205/665 |
| 3,772,161 | 11/1973 | Bogard et al. | 204/15 |
| 4,089,686 | 5/1978 | Townsend | 96/35.1 |
| 4,224,118 | 9/1980 | Hans | 204/15 |
| 4,743,462 | 5/1988 | Radzavich et al. | 427/34 |
| 4,978,558 | 12/1990 | Lamm | 427/250 |
| 5,441,767 | 8/1995 | DeSaulniers | 427/252 |

*Primary Examiner*—Donald R. Valentine
*Attorney, Agent, or Firm*—Mitchell D. Bittman

[57] ABSTRACT

A process is provided for plating a coating onto a gas turbine engine component without detrimentally effecting air flow through cooling holes by injecting a maskant into the cooling passage to fill the cooling holes with the maskant, plating the external surface of the component with a coating, then removing the maskant from the component.

15 Claims, 5 Drawing Sheets

PLATING TURBINE ENGINE COMPONENTS

BACKGROUND OF THE INVENTION

This invention relates to a process for plating gas turbine engine components, more particularly it relates to the masking of cooling holes in a gas turbine engine component during the plating process.

The blades and vanes which are commonly used in the turbine section of modern gas turbine engines are typically made of nickel and cobalt based superalloys. The composition of the superalloys are generally tailored to provide a desirable combination of mechanical strength and resistance to environmental degradation (e.g. oxidation and hot corrosion). Coatings are often used to increase the level of oxidation and hot corrosion resistance, allowing the components made from such superalloys to be used for long periods of time before they need to be replaced or repaired.

Such protective coatings can typically be applied by plating wherein an article is immersed in a plating medium. One problem faced by this coating technique is the deposition of the coating in unwanted areas. A variety of techniques have been developed to prevent coatings in undesired areas including the use of film forming polymeric resinous materials to protect the metal surface as is disclosed by U.S. Pat. No. 3,451,902. See also U.S. Pat. Nos. 2,999,771, 4,089,686 and 4,224,118.

In gas turbine engines various components, in particular the high temperature turbine blades and vanes, are invariably air cooled to permit operation of the engine at a higher temperature. This air cooling requires the use of complex air cooling passages and cooling holes in the blades and vanes. In the application of protective coatings to such blades and vanes there is the tendency of the coatings to enter the cooling hole passages and have a detrimental effect on air flow. This problem has been observed in plating processes, e.g. platinum plating, wherein the platinum enters into and overlaps the hole opening thereby plugging the hole and having a serious consequence on air flow therefrom. Some holes are observed to be completely plugged, while the plugging of other holes affects air flow by 10% to higher than 50%.

Various techniques which have been used in the art to deal with the hole plugging problem of plated blades have included: drilling the holes to a larger opening prior to coating to account for the subsequent plating; redrilling the holes after the plating has taken place; or sticking wires into the holes during the plating process. These methods are generally considered to be unsatisfactory, because they are time consuming and generally inefficient.

SUMMARY OF THE INVENTION

Briefly, a process is provided for plating a coating onto a gas turbine engine component which contains a plurality of cooling holes and a cooling passage comprising injecting a maskant into the cooling passage of the component to fill the cooling holes with the maskant, plating the external surface of the component with the coating, and removing the maskant from the component.

DETAILED DESCRIPTION OF THE DRAWINGS

A process is provided for plating a coating onto a gas turbine engine component containing a plurality of cooling holes and a cooling passage interconnected therewith. Components containing such cooling passages and cooling holes include blades, vanes and shrouds.

Figure 1:
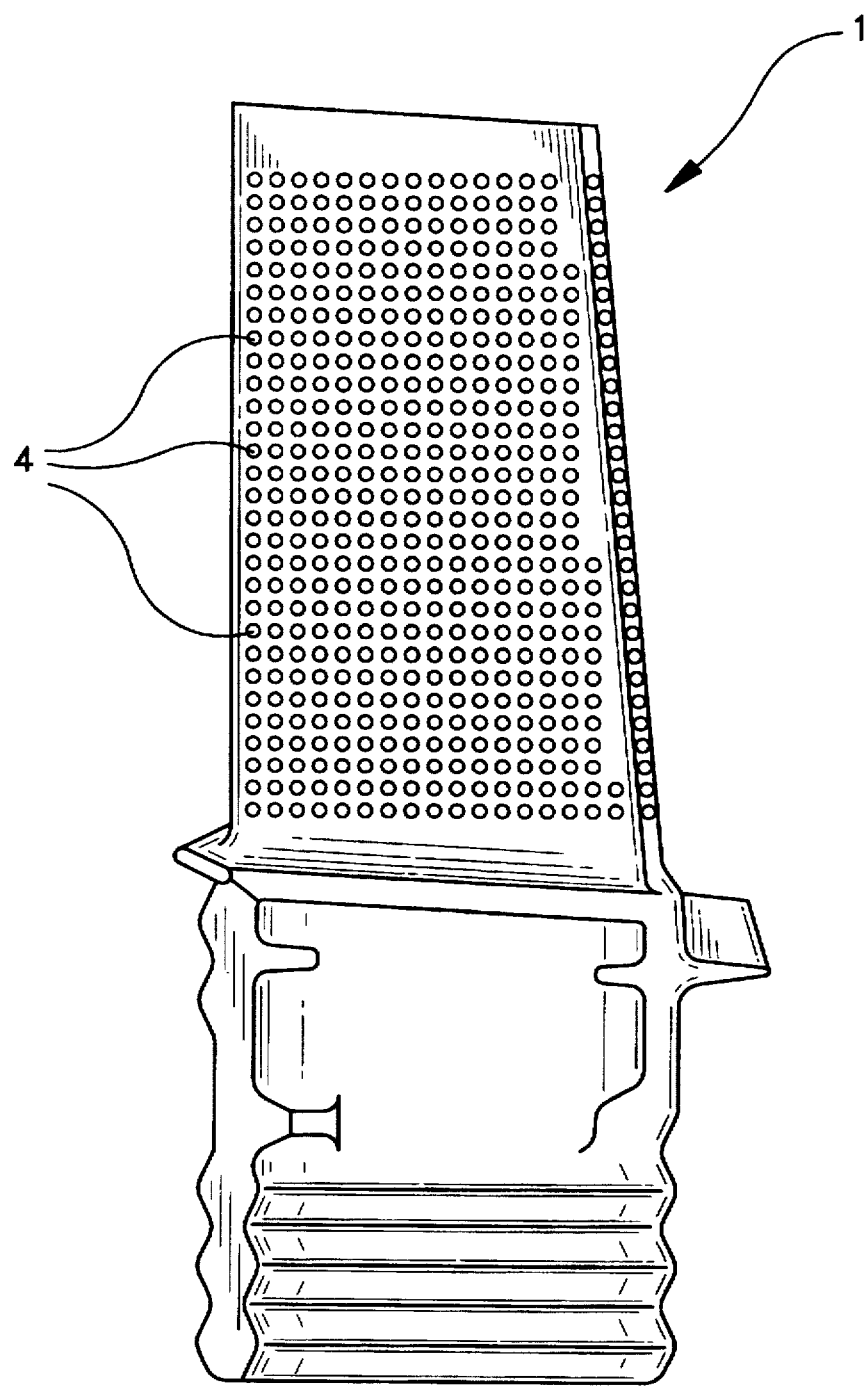
FIG. 1 is a representative turbine blade with cooling holes.
Figure 3:
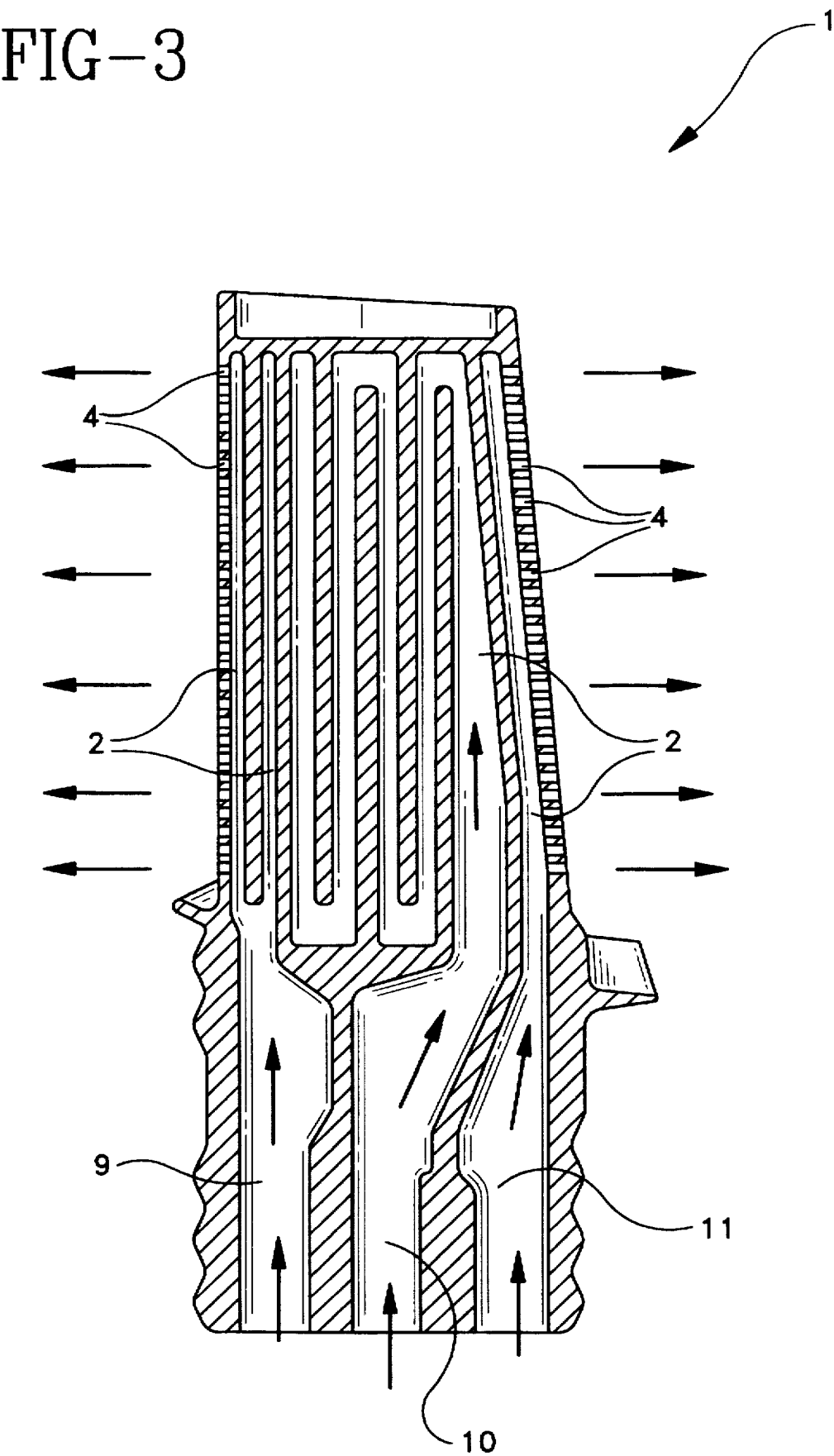
FIG. 3 is a cross section of a turbine blade showing the direction of plastic flow for masking.
Figure 4:
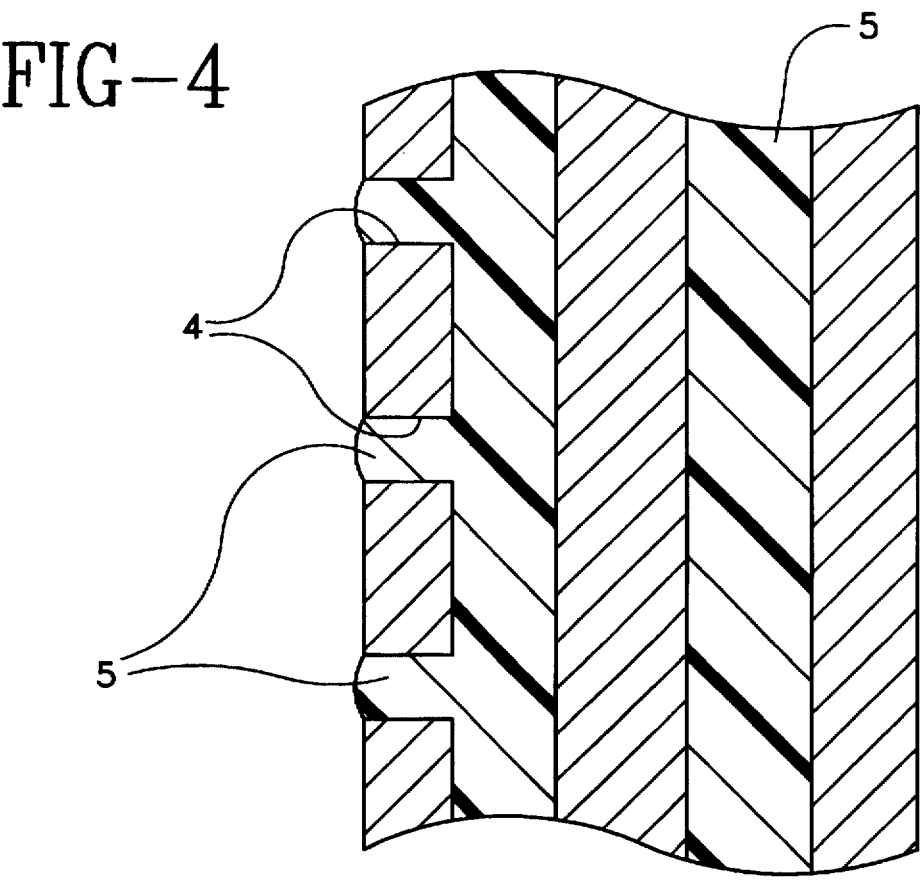
FIG. 4 is a cross section through cooling holes showing injected maskant.
Figure 5:
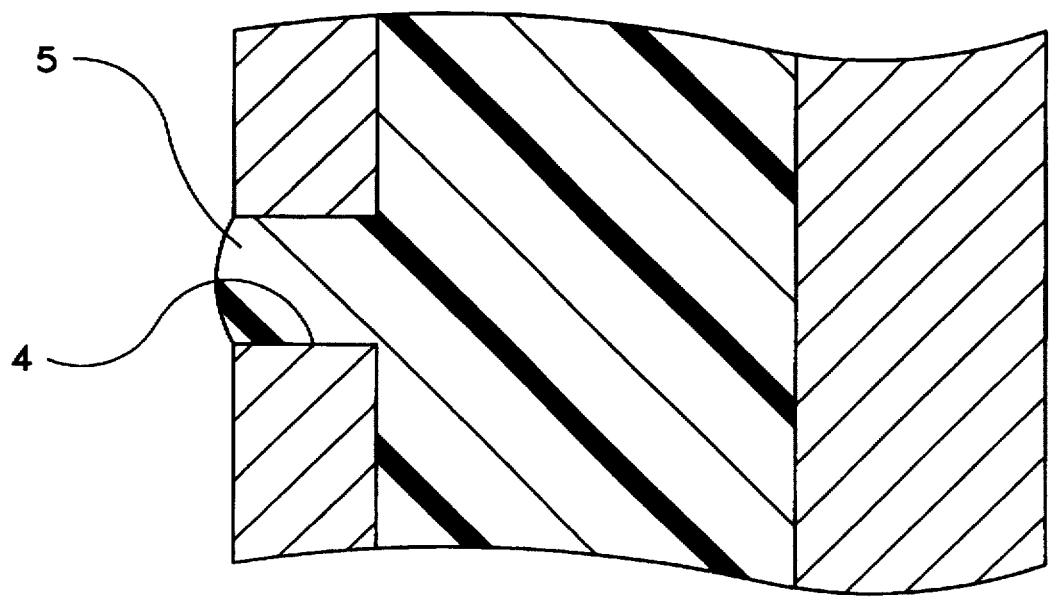
FIG. 5 is an expanded view of cross section through cooling holes showing maskant.

The first step of the process involves injecting a maskant into the cooling passage(s) of the component in order to fill the cooling holes with the maskant. As shown in FIGS. 1 and 3 typically, for blades 1 and vanes the cooling passages 2 are accessed and the injection is carried out through the root 3. In order for the maskant to effectively fill the cooling holes 4 it may be necessary to preheat the component, and insert the hot molten maskant into the cooling passages under pressure effective to fill the cooling holes. As shown in FIGS. 4 and 5 the cooling holes 4 are filled so that the maskant 5 is flush with the surface of the component. The maskant is preferably an organic material which will facilitate its application and subsequent removal. The maskant is used to prevent coating of the metallic surface areas it is in contact with during plating and should not detrimentally react with the metal surface of the component or interfere with the plating bath. Plastics are preferred in that they can be injection molded into the component in a liquid state, then cured to harden the plastic for the subsequent plating process. Suitable maskants include polypropylene and a polyurethane oligomer mixture. Preferably the maskant will not contain halogens which could detrimentally react with the metal surface. When injecting the maskant care should be taken that the maskant is not present on surfaces intended to be coated. Any maskant that is present on the outside of the component is generally removed before plating.

After the maskant is injected into the cooling holes and cured to harden, if required, then plating of the external surface of the component with the protective coating can be carried out. A preferred plating process is an electroplating process which is well known in the art. A preferred protective coating to be applied by the electroplating process includes noble metals such as platinum. The use of the maskant injected into the cooling holes during the plating process inhibits coating of the holes which detrimentally affects airflow.

Figure 2:
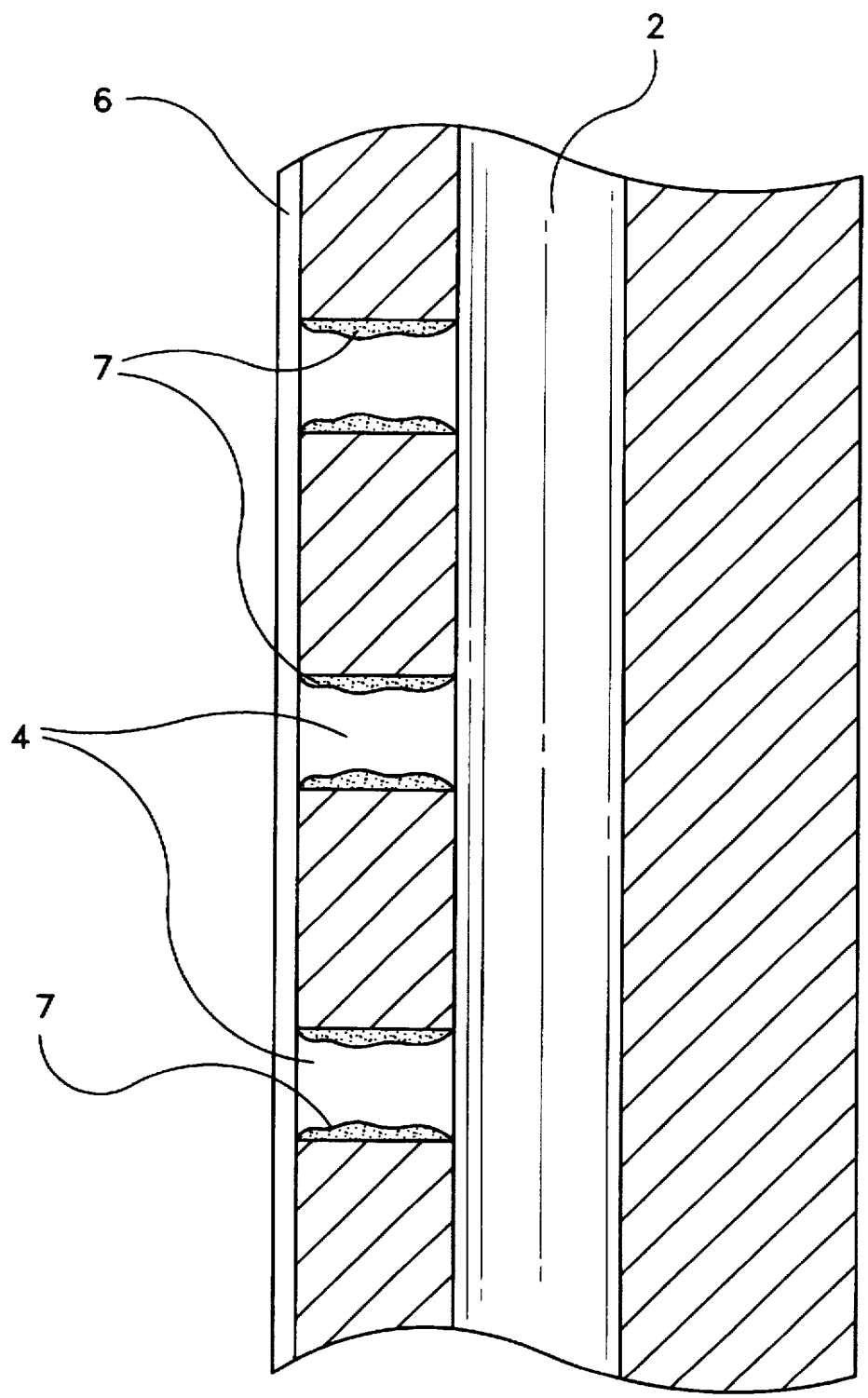
FIG. 2 is an expanded view of a cross-section through cooling holes showing cooling hole restrictions with platinum plating.
Figure 6:
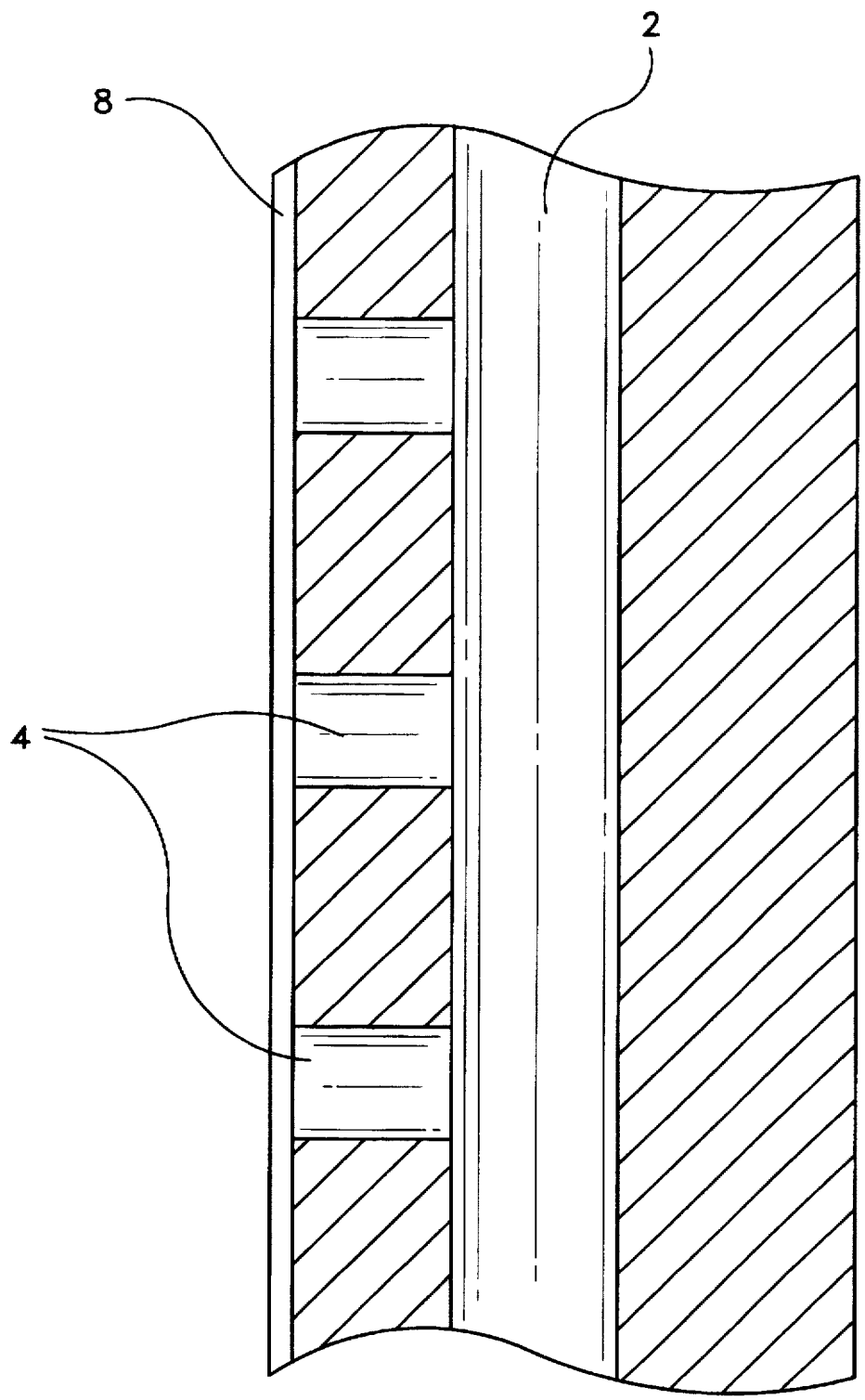
FIG. 6 is a cross section through cooling holes after platinum plating with maskant showing no cooling hole restriction.

Following completion of the plating process, the maskant is removed. A preferred maskant and method for its removal includes a maskant which will volatize on the application of high temperatures for an effective period of time. Other maskants which can be used include those which are removed by solvents. Typically the maskant can be removed by heat treatment at about 1100° F. to 1700° F. for 15 to 30 minutes. Treatment at these temperatures will not detrimentally effect the superalloy surface of the gas turbine engine component. As shown in FIG. 2, without the maskant filling the cooling holes during plating, platinum will plate both the external surface 6 and the internal passages of the cooling hole 7 which detrimentally affects air flow. With the maskant filling the cooling holes during plating the platinum will plate only the external surface 8 as shown in FIG. 6.

After removal of the maskant the component may then be processed as is common in the art, including a diffusion heat treatment to diffuse the protective coating, e.g. platinum, into the component's surface. Other operations may also be suitably carried out including the applications of additional coatings to the plated component. A preferred additional coating which is applied to a platinum coated substrate is a diffusion aluminide coating which can be applied by a vapor diffusion or pack diffusion (e.g. pack cementation) process followed by diffusion of the coating into the substrate at elevated temperatures (e.g. 1500° to 2000° F.).

EXAMPLE 1

Polypropylene at a temperature of about 400° F. and under a pressure of about 1000 psi is injected into the cooling passages 2 through the root 3 of a CF6-80C2 first stage blade (see FIG. 3), filling the cooling holes 4 of the blade. Excess polypropylene on the outside of the blade is cleaned off. The polypropylene sets to harden as it cools below about 200° F. The blade is then platinum plated in an electroplating bath containing a platinum diamminedinitrite solution at 180° F. for 90 minutes yielding a platinum thickness of 0.0002 to 0.0004 inches. Following plating the plastic is volitized by a burnout at 1100° F. for 30 minutes, ultrasonic cleaning in 150° F. water for 15 minutes and a water backflush for 5 minutes.

The platinum plated parts were further coated by having a diffusion aluminide coating applied to the platinum plated surface by pack cementation and diffusion at 1800° F. for 6 hours providing a platinum aluminide protective coating. The effect on airflow by hole plugging during platinum plating was measured with and without maskant injected into the cooling holes with the following observations. The average change in mass airflow is measured for each of the three chambers 9, 10 and 11 in the turbine blade 1 depicted in FIG. 3, with Wa indicating the leading edge chamber 9, Wb indicating the central chamber 10 and Wc indicating the trailing edge chamber 11.

The control (without maskant) showed an average change in mass airflow for each chamber over 5 different plating and coating runs as follows:

Wa—49.3%

Wb—27.8%

Wc—22.8%

The maskant injected blade showed an average change in mass airflow for each chamber over 5 different plating and coating runs as follows:

Wa—12.1%

Wb—8.6%

Wc—7.7%

The masked blades thus exhibited a dramatic improvement in airflow after platinum plating and coating compared to the control platinum plated and coated blades without use of maskant.

EXAMPLE 2

The process of Example 1 is repeated using a UV curable urethane acrylic polymer as the maskant which after injection is UV cured until hard and heat cured at 250° F. for 30 minutes.

The plated blades also exhibited open cooling holes with minimal airflow change.

What is claimed:

1. A process of plating a coating onto a gas turbine engine component containing a plurality of cooling holes and a cooling passage interconnected therewith comprising:

injecting a maskant into the cooling passage of the component filling the cooling holes of the component with the maskant;

plating the external surface of the component with a coating by immersing the component in a plating medium; and removing the maskant from the component.

2. Process of claim 1 wherein the maskant is an organic maskant.

3. Process of claim 2 wherein the organic maskant is removed by heating the component to a temperature and time effective to volatize the maskant.

4. Process of claim 3 wherein the organic maskant is a plastic.

5. Process of claim 4 wherein the plating is an electroplating process.

6. Process of claim 5 wherein the electroplating process applies a noble metal as the coating.

7. Process of claim 6 wherein the noble metal is platinum.

8. Process of claim 7 wherein the plastic is a polyurethane oligomer mixture.

9. Process of claim 7 further comprising heating the platinum plated component to diffuse the platinum into the surface.

10. Process of claim 7 further comprising applying a diffusion aluminide coating to the platinum plated component.

11. Process of claim 3 wherein after the plastic is injected it is cured to harden.

12. Process of claim 11 wherein the maskant on the outside of the component is removed before plating.

13. Process of claim 3 wherein the component is preheated prior to injecting the maskant and the maskant is injected into the cooling passage of the component under pressure effective to fill the cooling holes.

14. Process of claim 2 wherein the maskant is selected from the group consisting of polypropylene and polyurethane oligomer mixtures.

15. Process of claim 1 further comprising applying additional coatings to the plated component.

* * * * *